US010684010B2

(12) United States Patent
Munko et al.

(10) Patent No.: US 10,684,010 B2
(45) Date of Patent: Jun. 16, 2020

(54) BURNER ASSEMBLY AND METHOD FOR COMBUSTION OF GASEOUS OR LIQUID FUEL (71) Applicant: OUTOTEC (FINLAND) OY, Espoo (FI)

(72) Inventors: Andreas Munko, Bad Homburg (DE); Hartmut Köhler, Gerlingen (DE)

(73) Assignee: Outotec (Finland) Oy, Espoo (FI)

( * ) Notice: Subject to any disclaimer, the term of this patent is extended or adjusted under 35 U.S.C. 154(b) by 262 days.

(21) Appl. No.: 14/910,051

(22) PCT Filed: Aug. 6, 2013

(86) PCT No.: PCT/EP2013/066471
§ 371 (c)(1),
(2) Date: Feb. 4, 2016

(87) PCT Pub. No.: WO2015/018438
PCT Pub. Date: Feb. 12, 2015

(65) Prior Publication Data
US 2016/0201904 A1 Jul. 14, 2016

(51) Int. Cl.
F23N 1/02 (2006.01)
F23N 3/00 (2006.01)
(Continued)

(52) U.S. Cl.
CPC ............. F23N 1/02 (2013.01); F23C 7/06 (2013.01); F23C 9/00 (2013.01); F23D 14/22 (2013.01);
(Continued)

(58) Field of Classification Search
CPC ............ F23C 2900/99001; F23N 1/02
See application file for complete search history.

(56) References Cited

U.S. PATENT DOCUMENTS 4,313,757 A * 2/1982 Kiyonoga .............. C22B 1/2413
266/178
5,307,621 A * 5/1994 Glassman ................ F02B 31/00
431/9
(Continued)

FOREIGN PATENT DOCUMENTS

CA 2244365 C 5/2002
CN 201697128 U 1/2011
(Continued)

OTHER PUBLICATIONS

Notification of the First Office Action prepared by the State Intellectual Property Office of the People's Republic of China for CN 201380078771.6, dated Feb. 4, 2017, 17 pages.
(Continued)

Primary Examiner — Avinash A Savani
Assistant Examiner — Deepak A Deean
(74) Attorney, Agent, or Firm — Chernoff Vilhauer LLP (57) ABSTRACT Burner assembly and method for combustion of gaseous of liquid fuel The invention relates to a burner assembly (1) and a method for combustion of gaseous or liquid fuel to heat an industrial furnace (9) having a combustion chamber (2), at least one main combustion air inlet (3) for the supply of preheat-ed combustion air (4) into the combustion chamber (2), a burner (5) with at least one fuel feed (7) and at least one air feed (8) for supply of fuel and primary air into a the combustion chamber (2), wherein the burner (5) is positioned adjacent to a combustion zone of the combustion chamber (2) such that the combustion air (4) flowing into the combustion chamber (2) through the main combustion air inlet (3) is passing the burner (5) in the combustion zone and is then deflected such that the flow of preheated combustion air and the smaller flows of fuel and primary air are flowing mainly in parallel from the burner (5) to the furnace (9), and a control unit for controlling the supply of fuel and maybe
(Continued)

primary air into the combustion chamber (2). The control unit is adapted to supply the fuel and/or the primary air from the fuel and/or air feed (7, 8) into the combustion chamber (2) with an exit velocity higher than 150 m/s.

7 Claims, 5 Drawing Sheets (51) Int. Cl.

| | | |
|---|---|---|
| *F23C 9/00* | (2006.01) | |
| *F23D 14/22* | (2006.01) | |
| *F23C 7/06* | (2006.01) | |
| *F27D 99/00* | (2010.01) | |
| *F23D 99/00* | (2010.01) | |
| *F23D 14/84* | (2006.01) | |

(52) U.S. Cl.
CPC ............. *F23D 14/84* (2013.01); *F23D 91/02* (2015.07); *F23N 3/00* (2013.01); *F27D 99/0033* (2013.01); *F23C 2900/99001* (2013.01); *Y02E 20/342* (2013.01); *Y02E 20/348* (2013.01)

(56) References Cited

U.S. PATENT DOCUMENTS

| | | | |
|---|---|---|---|
| 6,113,384 A * | 9/2000 | Sebastiani ............... | F23D 14/74 431/12 |
| 8,202,470 B2 | 6/2012 | Cain et al. | |
| 2003/0175634 A1* | 9/2003 | Stephens ................ | F23C 6/045 431/8 |
| 2007/0048679 A1* | 3/2007 | Joshi ...................... | F23C 6/047 431/8 |
| 2010/0244336 A1* | 9/2010 | Cain .................... | C21B 13/0073 266/44 |
| 2011/0109021 A1* | 5/2011 | Cain ..................... | C22B 1/2406 266/44 |
| 2012/0006157 A1 | 1/2012 | Gautam et al. | |
| 2013/0157204 A1* | 6/2013 | Hong ..................... | F23D 14/64 431/354 |

FOREIGN PATENT DOCUMENTS

| | | |
|---|---|---|
| DE | 10 2007 006 243 A1 | 8/2008 |
| EP | 0 896 189 A2 | 2/1999 |
| WO | 01/07833 A1 | 2/2001 |
| WO | 2005/052446 A1 | 6/2005 |

OTHER PUBLICATIONS

International Search Report prepared by the European Patent Office for PCT/EP2013/066471, dated Feb. 5, 2014, 4 pages.

* cited by examiner

BURNER ASSEMBLY AND METHOD FOR COMBUSTION OF GASEOUS OR LIQUID FUEL

CROSS-REFERENCE TO RELATED APPLICATIONS

This is a national stage application filed under 35 USC 371 based on International Application No. PCT/EP2013/066471 filed Aug. 6, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable

BACKGROUND OF THE INVENTION

Not applicable

SUMMARY OF THE INVENTION

The invention relates to a burner assembly and a method for combustion of gaseous or liquid fuel, such as gas or oil, to heat an industrial furnace, in particular an indurating furnace of a common travelling grate pelletizing plant. The burner assembly has a combustion chamber, at least one main combustion air inlet for the supply of preheated combustion air into the combustion chamber, and a burner (also called burner block) with at least one fuel feed and at least one air feed for supply of fuel and primary air into the combustion chamber, wherein the burner is positioned adjacent to a combustion zone of the combustion chamber such that combustion air flowing into the combustion chamber through the main combustion air inlet is passing the burner in the combustion zone and is then deflected (e.g. at a wall of the combustion chamber) such that the (in particular large) flow of preheated combustion air and the (in particular smaller compared to the large flow of preheated combustion air) flows of fuel and primary air are flowing more or less in parallel from the burner to the furnace. The burner might preferably be installed in a wall of the combustion chamber, the combustion chamber typically being installed at the furnace. According to the invention, the flow of fuel and primary air are supplied from the burner preferably almost perpendicular to the main flow of preheated combustion air before the main flow of preheated combustion air is deflected.

Associated to the burner is according to the invention a control unit (also referred to as control equipment) for controlling at least the supply of fuel and primary air into the combustion chamber. Of course, the control unit might be adapted to control further process parameters, such as flow and/or temperature of preheated combustion air or the temperature inside the furnace and the output of the burner, for example.

Similar standard burners are often used in burner assemblies, for example with indurating furnaces of travelling grate pelletizing plants. The commonly used burners stabilize the flame right at the burner tip with the outlet openings. Due to the high combustion air temperature, which typically is up to 1000° C., also the flame inside the combustion chamber is very hot. This hot flame, typically with a theoretical maximum temperature of about 2000° C., causes a very high NOx-emission and might also lead to thermal damages at the combustion chamber wall. Typically, the flow velocity of the preheated combustion air is in the range between 15 to 25 m/s.

Due to the environmental efforts nowadays, the legally allowed emission limits of NOx are going to be reduced or have already been reduced leading to the problem that the commonly used standard burners in such industrial furnaces, and in particular in indurating furnaces of pelletizing plants, may be no longer allowed to be installed in some countries. Regarding the NOx-emission, the indurating furnaces produce high levels of NOx due to the high temperature in the furnace and the combustion of fuel and oxidant combustion air wherein the oxidant combustion air typically includes unheated (primary) air accompanying the fuel and a much larger amount of intensely preheated air fed into the combustion chamber by a so-called down corner (main combustion air inlet). The fuel is injected into the combustion air and ignited at the burner tip or nozzle leading to a stable and visible hot flame in the combustion zone of the combustion chamber with a theoretical maximum temperature of about 2000° C.

In order to reduce the NOx-emission, the U.S. Pat. No. 8,202,470 B2 describes a similar heating station (burner assembly) of an indurating furnace with an air passage leading to the heating station. A draft of preheated recirculation air is driven through a passage towards the heating station, and is mixed with fuel gas to form a combustible mixture that ignites in the passage. This is accomplished by injecting the fuel gas into the passage in a stream that does not form a combustible mixture with the preheated recirculation air before entering the passage. The proposed burner has mixer tubes for receiving streams of fuel and primary combustion air that are flowing through the mixer tubes to form a combustible mixture known as premix. This premix has a lean fuel-to-oxidant ratio which helps to avoid the production of interaction NOx. To this aim, the ignition is initially accomplished by use of an igniter in a reaction zone inside the outer tip of the mixer tubes. Combustion then proceeds as the premix is injected from the opening or nozzle of the mixer tubes into the combustion chamber to mix with the combustion air. The fuel in the premix is then burned in the combustible mixture with both premixed air and downdraft air.

This procedure helps to reduce the flame temperature as the fuel is mixed in a lean fuel-to-oxidant ratio upon ignition. During the further combustion, the fuel is mixed with the combustion air in a down corner leading to a more distributed flame in the combustion chamber having a lower flame temperature.

However, compared to common standard burners as used today, the proposed burner requires a certain temperature level of premix combustion air in order to avoid auto ignition and needs special efforts to combustion air and fuel gas supply to the burner and related to instrumentation.

It is, accordingly, an object of the present invention to propose a burner assembly and method for its use, in particular for an indurating furnace of a travelling grate pelletizing plant or for furnaces of Steel Belt Sintering (SBS™) or travelling grate sintering having a reduced NOx-emission, the burner being simple and durable in the construction and usable in existing plants without major reconstruction.

In order to reduce the NOx-emission it is provided in line with the invention to supply the fuel and/or the primary air from the fuel feed and/or air feed respectively into the combustion chamber with an exit velocity higher than 150 m/s (meter per second). Preferably, the exit velocity of the fuel and/or the primary air is higher than 200 m/s or even higher than the sound velocity of the fluid. A very preferred embodiment provides exit velocities of the fuel and/or the primary air between 250 m/s and the sound velocity.

It has been found with the invention that a very high exit velocity in particular of the fuel from the fuel feed into the combustion chamber leads to a strong and effective mixture of the fuel with the combustion air flowing through the main combustion air inlet. This combustion air is in the following also called secondary air. Due to the effective mixture of the fuel with the secondary combustion air as well as with the primary air, the fuel is well distributed in the combustion chamber when the fuel reacts with the oxygen in the air. Accordingly, there is no stable hot flame at the outlet opening or nozzle of the fuel feed at the burner block having flame peak temperatures of up to 2000° C., but a so-called lifted or a so-called mild flame.

The lifted flame—compared to the normal standard flame at the outlet opening or nozzle at the burner block—is positioned downstream of the burner tip and is a large-area or extensive flame because the fuel is more widely distributed in the combustion chamber and more secondary air is mixed in. Thus, the (still visible) lifted flame is located in the combustion chamber or even at the entrance between the combustion chamber and the furnace itself which is connected to the combustion chamber. As the flame is widely distributed in area, the average temperature of the flame is much lower than the temperature of a standard flame, and temperature peaks are reduced. This significantly reduces the NOx-emission and enhances the durability of the combustion chamber as the refractory of the combustion chamber is thermally less stressed.

For the mild flame, the combustion takes place even more separated from the burner in the combustion chamber or even in the furnace itself, and there is no or nearly no visible flame. Accordingly, this flameless combustion is a reaction of the fuel with the hot oxygen of the preheated combustion air in the combustion chamber and/or of the process air in the furnace itself, without an explicit ignition of a flame. The process air in the furnace shall have an amount of oxygen in the order 16 to 18 Vol-%, whereas the preheated combustion air shall have an amount of oxygen in the order equal to the ambient air, i.e. in the order 20.9 Vol-%. These are the standard amounts of oxygen, e.g. for an indurating process of a pelletizing plant.

Both the lifted and the mild flame have thus a lower average temperature and reduced temperature peaks as there is no concentrated combustion of fuel in a clearly defined luminous flame. It has been found with the present invention, that it is in contrast to e.g. the description of the U.S. Pat. No. 8,202,470 B2 not necessary to supply the fuel at different positions into the combustion chamber in order to achieve a staged combustion, but it is sufficient to supply the fuel and/or the primary air with a very high exit velocity from the fuel and/or air feed into the combustion chamber where the main combustion air (secondary air) is passing the burner block.

Of course, it is advantageous if the primary air supplied to the combustion chamber together with the fuel has an exit velocity comparable to the fuel. The primary air, which is normally not preheated and might have a temperature between 20° C. and 100° C., cools down the possible reaction zone directly in front of the output opening (nozzle) of the fuel and air feed, thus avoiding a spontaneous ignition of the fuel leading to a more or less stable standard flame. It has been found to be advantageous, if the primary air has at least a similar exit velocity as the fuel when being supplied into the combustion chamber.

According to a preferred embodiment, the control unit or equipment might be adapted to apply by means of e.g. a compressor or another pressure generator pressure to the fuel and/or the primary air to attain the desired exit velocity. In case of a fuel gas, such as natural gas, a typically preferred increase of pressure with respect to atmospheric pressure of the supplied fuel gas is about 2 bar, in particular a pressure in the range between 0.8 to 4 bar. A typically preferred increase of the pressure of the supplied primary air is in the range between 2 to 3 bar, or in the range at least between 0.8 to 4 bar. In case of a liquid fuel, such as oil, a typically preferred increase of the pressure is between 3 to 9 bar when using an atomizer medium (air or steam) with a pressure of 5 to 11 bar, or between 14 to 20 bar when using pressure atomizing. Preferably, the liquid fuel is atomized before the supply into the combustion chamber by a high pressure atomizing air applied to the fuel feed shortly before or right at the output opening or nozzle of the fuel feed, thus leading to an injection of the liquid fuel as a droplet cloud. It is, however, to be noted that the exit velocity depends strongly on the exit volume of the fuel and air feeds, i.e. in particular the form of the outlet opening or nozzle. The one skilled in the art would adjust the pressure accordingly in order to attain the desired exit velocities.

Different designs and types of nozzles for fuel gas and air might be used. The simplest design according to the invention is a straight cut tube. Also nozzles including a 40° inlet opening or even Laval type nozzles with special outlet design may be used. Most preferably, nozzles are used which offer a low pressure loss and a high outlet velocity.

The exit velocity of the fuel and the primary air might preferably be equal or similar. However, according to the invention as well as the geometry of the burner and the furnace, the exit velocity of the fuel and the primary air (and/or the pressure of the fuel and primary air, accordingly) might also be different. It might be useful, that the velocity and/or the pressure of the primary air is higher than the velocity and/or pressure of the fuel. In particular, the exit velocity of the primary air might be higher by a factor 1.5 to 2.5, in particular by a factor about 2.

It was found according to the invention, that another aspect to influence and reduce the NOx-emission during the combustion of fuel in the burner is the ratio of the primary air to fuel in the air and fuel feed of the burner block. In order to significantly reduce the NOx-emission, the control might be adapted to supply the fuel and the primary air into the combustion chamber at an excess air ratio λ of primary air to fuel equal or higher than 0.1.

The excess air ratio λ is defined as $$\lambda = m_{primary\ air}/m_{primary\ air.stoich}$$

with $m_{primary\ air}$: mass flow of primary air $m_{primary\ air.stoich}$: minimum mass flow of primary air required for the complete (stoichiometric) combustion of the fuel.

The primary air cools down the reaction zone in front of the outlet opening or nozzle of the fuel feed and thus avoids an immediate ignition of the fuel before the fuel feed or burner block. Preferably, the excess air ratio of primary air to fuel is between 0.1 and 0.6 and most preferably between 0.2 and 0.5. The ratio refers to the excess air ratio λ of the flow of primary air related to the flow of fuel.

It was found that it is advantageous if the excess air ratio is adapted to the exit velocity of the fuel and/or the primary air. In particular it is preferred that the excess air ratio is higher the smaller the exit velocity is. A preferred embodiment of the invention is using a range of the exit velocity of the fuel and/or the primary air between 250 m/s and the sound velocity and an air ratio λ of about 0.2 to 0.3.

According to a preferred embodiment, the combustion air (secondary air) fed to the combustion chamber through the combustion air inlet has a temperature of more than 750° C. and/or an oxygen concentration between 17% and 21%, in particular between 19% and 21%. A process temperature of more than 750° C. of the combustion air and/or the furnace is necessary for a spontaneous ignition and/or reaction of the fuel with the oxygen of the combustion air. This auto ignition will cause a standard, lifted or mild flame. The preferred embodiment avoids the stabilization of a standard flame, which will occur with a standard burner.

Accordingly, in contrast to known low NOx-burners using the principal of diluting the flame with a high amount of (internally) recirculating flue gases from the combustion itself containing only a very small amount of oxygen, typically 1% to 7%, such a dilution is not possible for a certain processes, such as the indurating in a pelletizing plant, because the flue gases in the indurating furnace itself contain a much higher amount of oxygen of about 17%, such leading to a reaction (standard flame) when contacting the fuel supplied into the combustion chamber. Moreover, the invention does not require an external recirculation of flue gases with low $O_2$ content into the combustion air, which may be done by additional blowers. Both internal and external flue gas recirculation may cause problems due to a certain content of dust in the process gas.

According to a preferred embodiment of the burner assembly according to the invention it might be provided that the control is adapted, after a first ignition of the burner, to supply the fuel and the primary air at an exit velocity lower than 150 m/s through the fuel feed and the air feed respectively into the combustion chamber, until the combustion air in the main combustion air inlet and/or the combustion chamber has reached a temperature higher than a predefined temperature value. Another or an additional criterion is until the process air in the furnace has reached a temperature higher than a predefined temperature value. So far, a normal combustion with a standard flame occurs until the processed temperature has reached the required minimum temperature. To this aim, the predefined temperature is preferably about 750° C. as mentioned before. Upon exceeding the predefined temperature value, e.g. 750° C., the control is adapted to apply the fuel and primary air at an exit velocity higher than 150 m/s through the fuel feed and the air feed into the combustion chamber. In particular, the velocity and the ratio of primary air to the fuel (in particular excess air ratio λ) might be chosen as described above. The increase of velocity may be realized by increasing the volume flow of fuel gas and/or primary air when using the same fuel/air lances, or by switching from one type of lances providing low velocity to a second type of lances providing a high velocity at a constant gas and/or primary air flow. In this second operational mode of a lifted or mild flame, the NOx is significantly reduced compared to an operational mode in which a standard flame configuration is used all the time.

According to a preferred constructional feature, the fuel feed and the air feed in the burner might form at least one supply tube in form of a duplex lance having a central tube and a surrounding tube around the central tube with open ends towards the combustion chamber. This type of tube is also called duplex lance. The central tube might be preferably used for the fuel feed and the surrounding tube might be preferably used for the primary air feed. However, according to the invention, the use of the surrounding and the central tube might be also vice-versa. In case of the use of more than one supply tube, a mixed use as described above is possible, i.e. one part of the supply tubes might be used with the central tubes for the fuel feed and another part of the supply tubes might be used with the central tube for the primary air feed. Depending on the position of the supply tubes (duplex lances) in a burner block, the proposed mixed use of the supply tubes might optimize the mixture of the fuel and the secondary air (main combustion air) in the combustion chamber.

The open ends of the central tube and the surrounding tube might form as outlet opening a structured nozzle different from a simple open tube end in order to influence the flow of the primary air and/or fuel in a certain way, for example to enhance the mixing of the fuel and the primary and/or secondary air or to modify the outlet velocity.

A preferred embodiment of a structured nozzle has an input opening corresponding to the inner diameter of the surrounding tube and an output opening with a smaller diameter than the input opening. The diameter of the output opening might be about the half of the diameter of the input opening. The inner wall of the structured nozzle can have a surface at least partially reducing in conical form. This form enhances the outlet velocity and has shown positive test results.

In another embodiment according to the invention, the structured nozzle might have an input opening corresponding to the inner diameter of the surrounding tube and an output opening with a larger diameter than the input opening. As an example, such nozzles can be Laval type nozzles that may be used according to the invention.

According to the invention, supply tube may have a structured nozzle with one single channel into which both the central tube and the surrounding tube end. Accordingly, the fuel and primary air supplied into the nozzle through two different tubes, in particular a central tube and a surrounding tube, are flowing through one and the same channel of the nozzle before leaving the nozzle and the supply tube, respectively, into the combustion chamber.

According to the invention, the burner might have more than one supply tube. Preferred embodiments might have two to six supply tubes or duplex lances.

According to a preferred embodiment of the invention, the main combustion air inlet might be a down corner in which the combustion air (secondary air) is guided downwards vertically and diverted in vertical direction before entering the combustion chamber and the furnace. In this arrangement, the burner block is preferably positioned such that the fuel and primary air applied into the combustion chamber is flowing linearly through the combustion chamber into the furnace in line with the main flow direction of the diverted combustion air (secondary air).

The invention also relates to a method for combustion of gaseous or liquid fuel, such as natural gas or oil, to heat an industrial furnace, in particular an indurating furnace of a pelletizing plant, using a burner assembly as described before or parts thereof. The burner assembly used according to the method of the invention has a combustion chamber, at least one main combustion air inlet for supplying preheated combustion air into the combustion chamber, a burner with at least one fuel feed and at least one air feed for the supply of fuel and primary air into a the combustion chamber, wherein the burner is positioned adjacent to a combustion zone of the combustion chamber such that the combustion air flowing into the combustion chamber through the main combustion air inlet is passing the burner in the combustion zone and is then deflected such that the flow of preheated combustion air and the smaller flows of fuel and primary air are flowing mainly in parallel from the burner to the furnace. Further, associated to the burner is a control unit for controlling the supply fuel and maybe primary air into the combustion chamber. According to the invention, the fuel and/or the primary air is supplied from the fuel and/or air feed into the combustion chamber with an exit velocity higher than 150 m/s (meter per second). The proposed method might use all features described before with respect to the burner according to the invention. Accordingly, these aspects of the before description are valid also for the method and will not be described again in detail.

The proposed method might also provide that the fuel and/or the primary air in the fuel feed and/or the air feed are pressurized for attaining the exit velocity, in particular with a pressure between 0.8 to 4 bar for gaseous fuel and 2 to 8 bar for liquid fuel. The attained exit velocities of the fuel and the primary air and/or the pressure of the fuel and the primary air might be different. It is however preferred that the velocities are equal (or at least similar).

A significant aspect to reduce the NOx-emission of the combustion is also the ratio of primary air to fuel during the supply of the fuel and the primary air into the combustion chamber. The excess air ratio $\lambda$ as defined before should be higher than 0.1, in particular between 0.1 and 0.6 and most preferably between 0.2 and 0.5.

Further, the combustion air might be fed according to the proposed method into the combustion chamber through the main combustion air inlet with a temperature of more than 750° C. and/or an oxygen concentration between 17% and 21%.

Liquid fuel might be injected into the combustion chamber as a droplet cloud, which can according to a preferred embodiment be achieved by atomizing air introduced into the fuel supply tube.

According to an preferred embodiment of the method it might also be provided that, after ignition of the burner, the fuel and the primary air are supplied at an exit velocity lower than 150 m/s through the fuel feed and the air feed into the combustion chamber until the combustion air in main combustion air inlet and/or the combustion chamber have a temperature higher than a predefined temperature value, e.g. 750° C. as explained before. Only upon exceeding this predefined temperature value, the fuel and the primary air are supplied at an exit velocity higher than 150 m/s through the fuel feed and the air feed into the combustion chamber. Preferably, the exit velocity might be in a range between 250 m/s and sound velocity.

The proposed burner and method have the further advantage that the burner can work with a standard flame as well as with a lifted or mild flame. This can easily be realized by using different excess air ratios. Accordingly, an excess air ratio of primary air to fuel smaller than 0.1 ($\lambda$<0.1) is leading to a standard flame and an excess air ratio of primary air to fuel larger than 0.1 ($\lambda$>0.1) is leading to a lifted flame (12) or mild flame (13). For having a standard flame, i.e. a conventional burner modus, the exit velocity of the fuel and/or the primary air might be according to the invention also slower than 150 m/s.

Further features, advantages and possible applications of the invention can also be taken from the following description of an exemplary embodiment and the drawing. All features described and/or illustrated form the subject-matter of the invention per se or in any combination, independent of their inclusion in the claims or their back-reference.

DETAILED DESCRIPTION OF THE INVENTION

Figure 1:
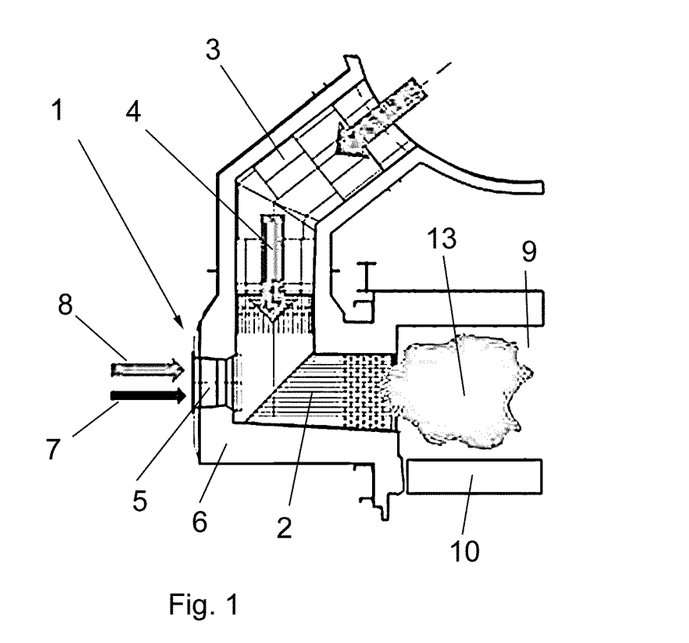
FIG. 1 schematically shows a section through a burner assembly according to a preferred embodiment of the invention.

In FIG. 1 a burner assembly 1 according to a preferred embodiment of the invention is shown in a sectional view. The burner assembly 1 has a combustion chamber 2, a main combustion air inlet 3 for the supply of preheated combustion air 4 into the combustion chamber 2 and a burner 5 positioned in a wall 6 of the combustion chamber 2 such that combustion air 4 flowing into the combustion chamber 2 through the main combustion air inlet 3 is passing the burner 5. The burner 5 has at least one fuel feed 7 and at least one air feed 8 for the supply of fuel and primary air, respectively, into the combustion chamber 2. Further, with the burner assembly 1 a control unit or equipment (not shown) is provided for controlling the supply of fuel and primary air into the combustion chamber.

The combustion chamber 2 is open towards the industrial furnace 9, in which the desired treatment of material is performed.

According to a preferred embodiment of the invention, the industrial furnace 9 is an indurating furnace with a travelling grate 10 of a pelletizing plant. In such a pelletizing plant, the main combustion air inlet is typically a down corner 3 through which secondary air, i.e. the preheated combustion air 4, is flowing downwards into the combustion chamber 2 thereby passing the burner block 5 and then diverted vertically into the furnace 9 through the combustion chamber 2. In the combustion chamber 2, the fuel supplied into the combustion chamber 2 through the fuel feed 7 is mixed with the preheated combustion air 4 building a flame to heat the furnace 9 to the desired temperature.

Figure 2:
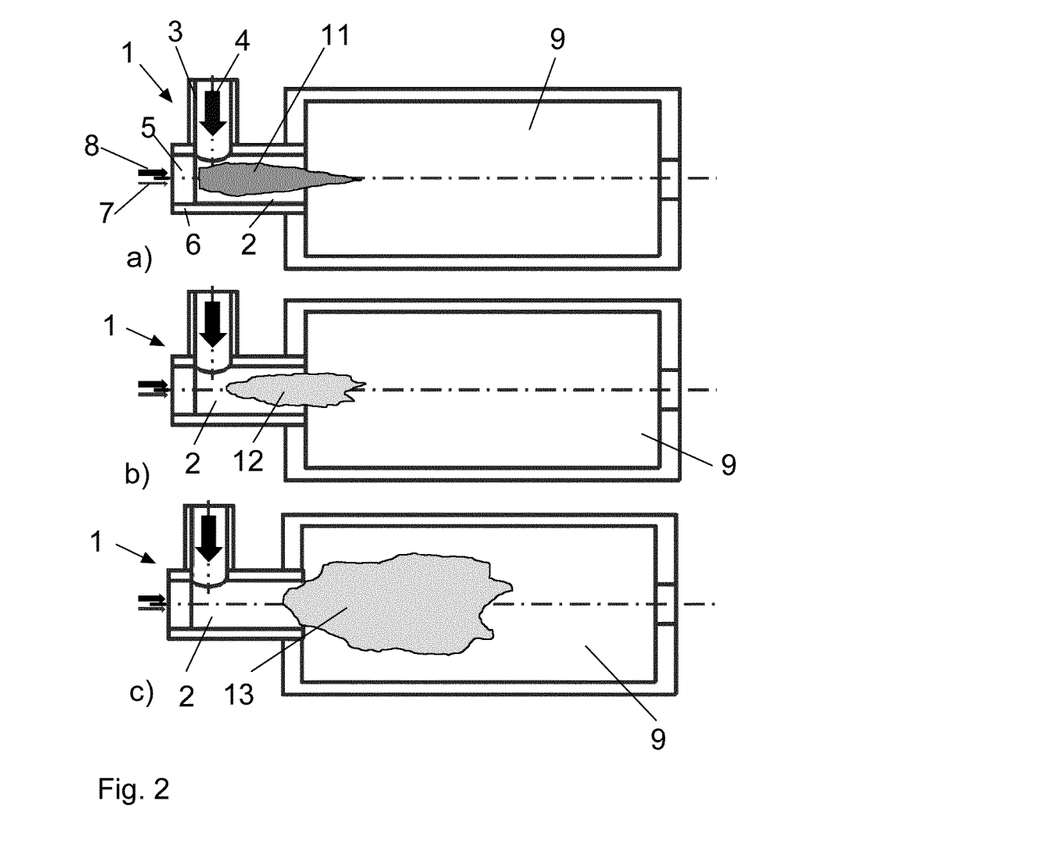
FIG. 2 schematically shows different flame types of the burner attainable with the burner assembly according to FIG. 1.

In a conventional burner assembly 1, the flame in the combustion chamber 2 is a standard flame 11 (as shown in FIG. 2a). The standard flame 11 is ignited just at the end of the fuel feed 7 and open towards the combustion chamber 2. Accordingly, the standard flame 11 is contained almost completely inside the combustion chamber and has a stable, conventional flame-like form, whereas the standard flame 11 is stabilized very close to the burner tip. The peak temperature in such a standard flame 11 is typically higher than 1500° C. whereas the temperature in the furnace 9 will be about 1300° C. (at least for an indurating furnace 9 of a pelletizing plant).

Due to the high flame temperature, there is a high amount of thermal NOx produced by the flame. In order to reduce this thermal NOx-emission, it would be necessary to reduce the flame mid temperature and to avoid high peak temperatures.

In order to achieve this goal, the invention proposes to destabilize the standard flame 11 as shown in FIG. 2a.

In contrast to the prior art proposing a burner with a staged combustion and a multi-point fuel supply into the combustion chamber of the burner (see U.S. Pat. No. 8,202,470 B2), the invention proposes to enhance the exit velocity of at least the fuel supplied into the combustion chamber through the fuel feed 7 of the burner block 5. Due to the high velocity of the fuel introduced into the combustion chamber, the stabilization of a standard flame 11 right in front of the fuel outlet openings is not possible and the fuel mixes much better with the secondary air (preheated combustion air 4) before ignition.

This leads at least to a lifted flame 12 as schematically shown in FIG. 2b being one of the preferred flames according to the invention. This lifted flame 12 covers a larger reaction area than the standard flame 11 and provides a more equally distributed temperature inside the flame as the fuel is not concentrated around the nozzle of the fuel feed 7 in the burner 5 but well distributed inside the combustion chamber 2 due to the extensive mixture of the fuel with the secondary combustion air 4. Accordingly, the flame mid temperature is reduced and the flame is lifted away from the burner 5 in the direction of the combustion air flow towards the furnace 9. The lifted flame 12 is generated in the combustion chamber 2 and may partially reach into the furnace 9 itself.

However, according to the present invention, the most preferred flame is a strongly lifted or mild flame 13 as shown in FIG. 2c and FIG. 1.

With the mild (or strongly lifted) flame 13, there is no or nearly no visible flame in the combustion chamber 2 or the furnace 9 itself. Instead, the fuel reacts with the preheated combustion air 4 (secondary air) in a more or less flameless reaction due to the elevated temperature of the secondary air. This is achieved by an even larger distribution of the fuel in the secondary combustion air 4, avoiding thus fuel enriched zones in the combustion air leading to a visible flame 11. The reaction between the fuel and the combustion air 4 regularly takes place mostly at the end of the combustion chamber 2 and in the furnace 9 itself. Accordingly, the mid temperature of this reaction over the complete reaction zone is much lower than the mid temperature in the standard flame 11 or even in the lifted flame 12. According to the present invention, this is attained by the high dilution with combustion air due to the very high exit velocity of the fuel out of the fuel feed 7 in the burner block 5 and/or the excess air ratio.

For clarity reasons, not all reference sign are reproduced in the FIGS. 2b and 2c. They are considered the same as in FIG. 2a.

Additionally, with the fuel supplied into the combustion chamber 2, primary air is fed through an air feed 8 in the burner block 5 into the combustion chamber 2. Advantageously, also the primary air is supplied into the combustion chamber 2 with an exit velocity higher than 150 m/s. The fuel and the primary air might be fed into the combustion chamber with the same exit velocity which preferably is higher than 250 m/s. Of course, it is also possible to have the different exit velocities of the fuel and the primary air.

Contrary to the secondary air being a combustion air preheated to a temperature of about 750 to 1000° C. for example, the primary air has a low ambient-like temperature in the range of preferably 20° C. to 100° C. when being supplied into the combustion chamber. The primary air has the effect, that it cools down the possible reaction zone in front of the fuel and air feeds in the combustion chamber 2 thus avoiding a fast ignition of the fuel in the preheated combustion air. Accordingly, the fuel is transported along with the preheated combustion air 4 more deeply into the combustion chamber 2 and the furnace 9 leading to a lifted flame 12, or optimally to a mild flame 13 with no or nearly no visible flame.

Figure 3:
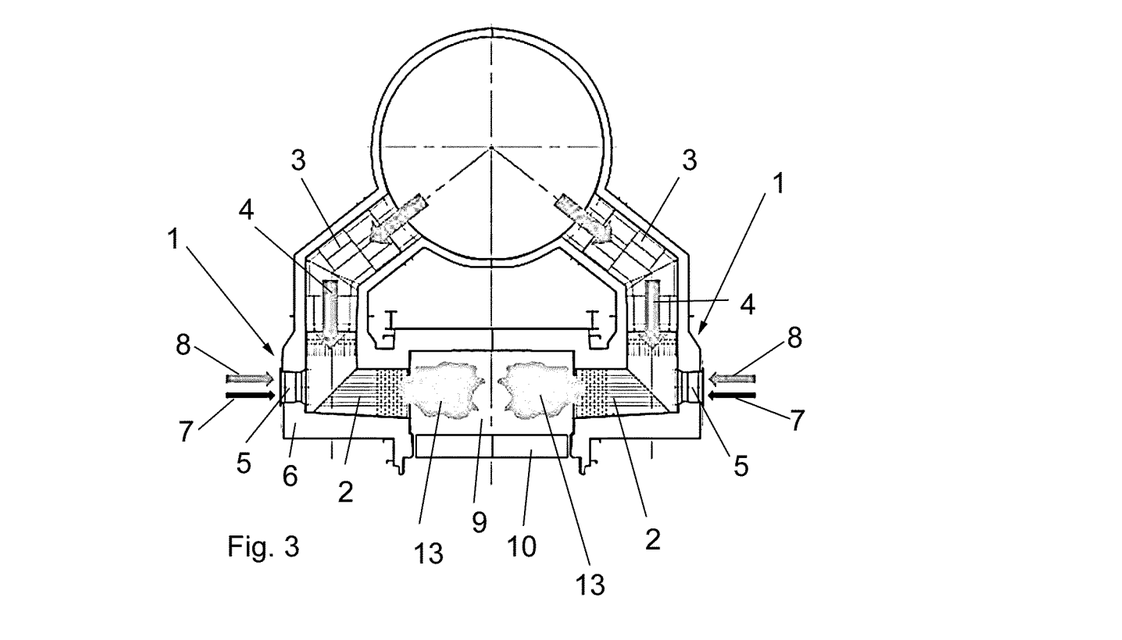
FIG. 3 schematically shows a section through an induration furnace with two burner assemblies.

FIG. 3 shows a cross section through a indurating furnace 9 with a traveling grate 10 and two burner assemblies 1 as shown in FIG. 1. The preheated combustion air (secondary air) is fed into the combustion chamber 2 and the furnace 10 through a down corner 3 being the main combustion air inlet. In FIG. 3, a mild flame 13 is shown.

In order to achieve the desired exit velocities of the fuel and the primary air, the fuel and the primary air might be pressurized, controlled by the control unit of the burner assembly 1. Typically, the (gaseous) fuel and the primary air are pressurized with a preferred increase of pressure of about 3 bar or the range of 0.8 to 4 bar.

The primary air might even be pressurized to a higher value such as 6 or 7 bar.

Basically, the higher the pressure of the fuel and the primary air is, the higher is the exit velocity of the fuel and the primary air and the better is the mixture of the fuel with the preheated combustion air 4. In order to achieve even supersonic speed special nozzles, such as Laval type nozzles, may be used. Accordingly, for attaining a mild flame 13, the exit velocity and the pressure, respectively, will be higher than for a lifted flame 12 in the same burner and furnace array. Also an increase of the excess air ratio may change the flame type from lifted flame to mild flame.

One big advantage of the described burner assembly 1 is, that the burner 5 is able to produce also a standard flame 11, for example when heating the furnace 9 and the combustion chamber 2 to the process temperature, by supplying the fuel and the primary air with a much lower velocity below 150 m/s thus obtaining a stable flame, if required.

Figure 4:
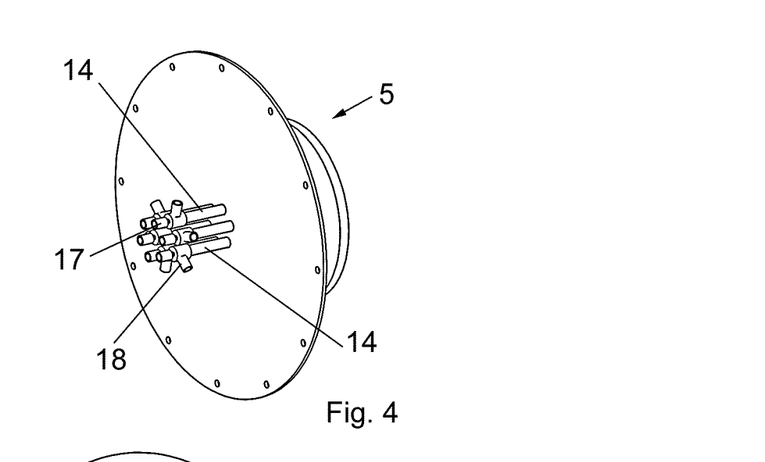
FIG. 4 shows a perspective view from the rear of a burner with the mixing tubes according to a preferred embodiment.
Figure 5:
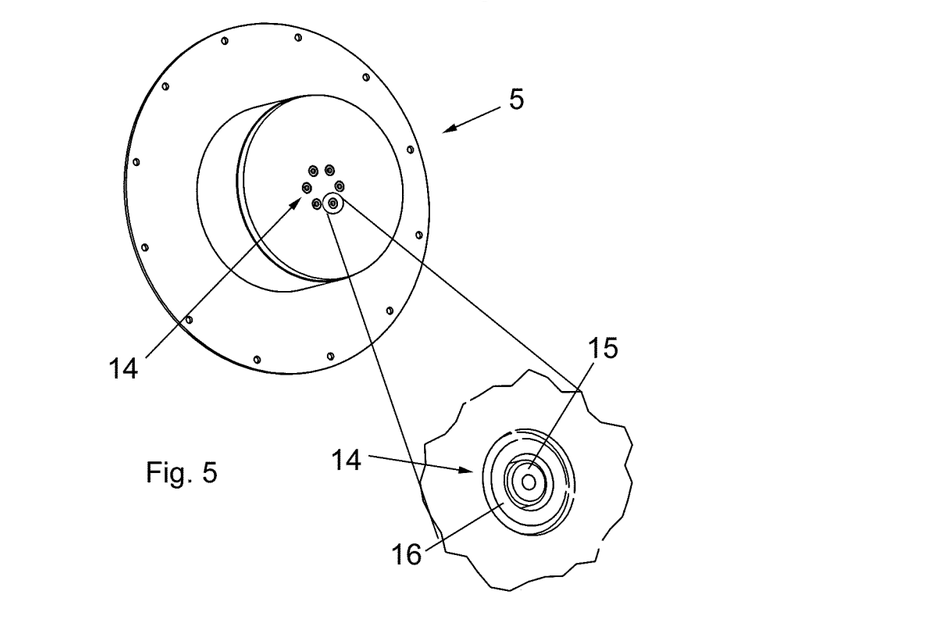
FIG. 5 shows a perspective view from the front of the burner according to FIG. 4 with the openings of the supply tubes directed into the combustion chamber.

FIGS. 4 and 5 show a burner block 5 from the rear (FIG. 4) and from the front (FIG. 5), the front being defined as the side of the burner block 5 directed towards the combustion chamber 2.

Inside the burner block 5, there are provided several supply tubes 14, each in form of a duplex lance having a central tube 15 and a surrounding tube 16 as evident from the detail in FIG. 5.

Preferably, the central tube 15 is used as fuel feed tube and the surrounding tube 16 is used as air supply feed tube for the primary air. It has been found, that this configuration of the fuel feed 7 and the air feed 8 in a duplex lance 14 is easy to handle and has good results with regard to the mixture of fuel and primary air into the secondary or preheated combustion air 4 in the combustion chamber 2.

Figure 6:
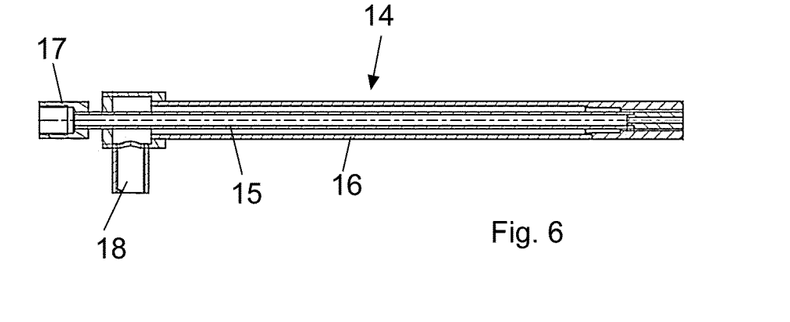
FIG. 6 shows a section through a preferred supply tube according to a first embodiment.

In FIG. 6, the openings of the central tube 15 and the secondary tube 16 include a nozzle with reduced opening diameter, but they may be simply open by a cut through the tubes. However, it is possible to provide at the open end of the central tube 15 and/or the surrounding tube 16 separated nozzles for fuel and primary air, or even one common nozzle for fuel and primary air, as shown in FIG. 6 or 7, in order to influence the entry, mixing and flow of the fuel and the primary air into the combustion chamber 2 according to the desired form of the flame and/or the geometry of the burner 1 and/or furnace 9.

In order to supply the fuel and the secondary air under pressure into the supply tube 14, there are provided—as evident from FIG. 5—a first port 17 to the central tube 15 and a second port 18 to the surrounding tube 16 for each supply tube or duplex lance 14.

FIG. 6 shows a cross-sectional view of one supply tube or duplex lance 14 with a central tube 15 and the surrounding tube 16 and the respective first port 17 to the central tube 15 and the second port 18 to the surrounding tube 16. As evident from FIG. 6, the cross section of the openings of the central tube 15 and the surrounding tube 16 are brought to a certain form and volume in order to be able to adjust the exit velocity and direction of the fuel and the primary air. Preferably they also adjust the excess ratio of primary air and fuel.

Figure 7:
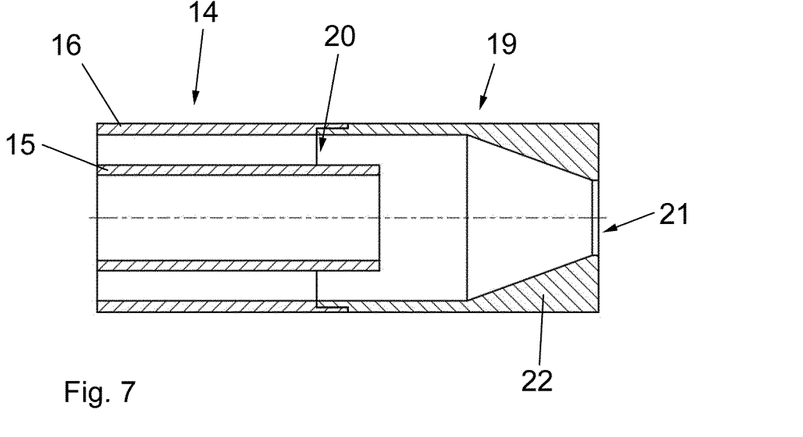
FIG. 7 shows a section though a preferred supply tube according to a second embodiment.

FIG. 7 shows a supply tube 14 as described before with a structured nozzle 19 with an input opening 20 corresponding to the inner diameter of the surrounding tube 16 of the duplex lance 14 and an output opening 21 with a smaller diameter than the input opening 20. The diameter of the output opening 21 might be about the half of the diameter of the input opening 10. The inner wall of the structured nozzle 19 has partially a surface 22 reducing in conical form. This form enhances the outlet velocity and has shown positive test results. Fuel gas and primary air flow through the central tube 15 and the surrounding tube 16 and through the nozzle 21. In this example, the nozzle has only one common channel for both, the fuel and the primary air.

Tests have shown, that the excess air ratio of the primary air related to the fuel should be preferably about 0.2 to 0.5 in order to achieve a low NOx-combustion in the burner 1.

The proposed burner assembly 1 and method are advantageous because the burner 5 itself can be used as conventional burner 5 to produce a stable flame 11 as well as a low NOx-burner producing a lifted flame 12 or mild flame 13 by just amending the exit velocity and/or excess ratio of primary air to fuel.

LIST OF REFERENCE SIGNS 1 burner assembly
2 combustion chamber
3 main combustion air inlet, down corner
4 preheated combustion air (secondary air)
5 burner, burner block
6 wall of combustion chamber
7 fuel feed
8 air feed for supply of primary air
9 industrial furnace, indurating furnace
10 traveling grate
11 standard flame
12 lifted flame
13 mild flame
14 supply tube, duplex lance
15 central tube
16 surrounding tube
17 first port to central tube
18 second port to the surrounding tube
19 structured nozzle
20 input opening
21 output opening
22 conically reducing surface

The invention claimed is:

1. Method for combustion of gaseous or liquid fuel to heat an industrial furnace (9) having process air with an amount of oxygen of 16 to 18 Vol-% comprising:

providing a burner assembly (1) having a combustion chamber (2), at least one main combustion air inlet (3) for supplying preheated combustion air (4) with an amount of oxygen of ambient air into the combustion chamber (2), a burner (5) with at least one fuel feed (7) and at least one air feed (8) for the supply of fuel and primary air into a the combustion chamber (2);

positioning the burner (5) adjacent to a combustion zone of the combustion chamber (2) such that the combustion air (4) flowing into the combustion chamber (2) through the main combustion air inlet (3) is passing the burner (5) in the combustion zone and is then deflected such that the flow of preheated combustion air and the smaller flows of fuel and primary air are flowing mainly in parallel from the burner (5) to the furnace (9); and controlling the supply of fuel from the fuel feed (7) into the combustion chamber to produce an exit velocity that is higher than 150 m/s and less than the sound velocity; and controlling the supply of primary air from the air feed (8) into the combustion chamber (2) such that the excess air ratio of primary air to fuel during the supply of fuel and primary air into the combustion chamber (2) is between 0.1 and 0.6, wherein controlling the supply of primary air from the air feed (8) into the combustion chamber (2) includes controlling the primary air from the air feed (8) such that the velocity of the primary air is higher than the velocity of the fuel feed by a factor of about 2.0.

2. Method according to claim 1, wherein positioning the burner (5) adjacent to a combustion zone includes feeding combustion air (4) into the combustion chamber (2) through the main combustion air inlet (3) with a temperature of more than 750° C.

3. Method according to claim 1, wherein controlling the supply of primary air from the air feed (8) includes, after ignition of the burner, initially controlling the supply of the primary air to produce an exit velocity lower than 150 m/s through the fuel feed (8) into the combustion chamber (2) until the combustion air (4) in the main combustion air inlet (3) and/or in the combustion chamber (3) has a temperature higher than a predefined temperature value, and, upon exceeding the predefined temperature value, subsequently controlling the primary air through the air feed (8) into the combustion chamber (2) to produce an exit velocity higher than 150 m/s and less than the second velocity.

4. Method according to claim 1, wherein controlling the supply of primary air from the air feed (8) includes controlling the primary air from the air feed (8) into the combustion chamber (2) via a compressor.

5. Method according to claim 1, wherein controlling the supply of fuel from the fuel feed (7) includes pressurizing the fuel in the fuel feed such that the exit velocity is attained.

6. Method according to claim 1, wherein controlling the supply of fuel from the fuel feed (7) includes controlling the supply of fuel from the fuel feed (7) such that excess air ratio of primary air to fuel during supply of fuel and primary air into the combustion chamber (2) is between 0.2 to 0.5.

7. Method according to claim 1, wherein controlling the supply of fuel from the fuel feed (7) includes, after ignition of the burner, initially controlling the supply of the fuel to produce an exit velocity lower than 150 m/s through the fuel feed (7) into the combustion chamber (2) until the combustion air (4) in the main combustion air inlet (3) and/or in the combustion chamber (3) has a temperature higher than a predefined temperature value, and, upon exceeding the predefined temperature value, subsequentialy controlling the supply of the fuel through the fuel feed (7) into the combustion chamber (2) to produce an exit velocity higher than 150 m/s and less than the sound velocity.

\* \* \* \* \*